US010676158B2

(12) United States Patent
Tan

(10) Patent No.: US 10,676,158 B2
(45) Date of Patent: Jun. 9, 2020

(54) WATERCRAFT USING NARROWING CONCAVE CHANNELS

(71) Applicant: Yu Lee Tan, Tanjung Bunga (MY)

(72) Inventor: Yu Lee Tan, Tanjung Bunga (MY)

( * ) Notice: Subject to any disclaimer, the term of this patent is extended or adjusted under 35 U.S.C. 154(b) by 0 days.

(21) Appl. No.: 15/557,632

(22) PCT Filed: Mar. 11, 2016

(86) PCT No.: PCT/MY2016/050013
§ 371 (c)(1),
(2) Date: Sep. 12, 2017

(87) PCT Pub. No.: WO2016/144156
PCT Pub. Date: Sep. 15, 2016

(65) Prior Publication Data
US 2018/0065709 A1    Mar. 8, 2018

(30) Foreign Application Priority Data
Mar. 12, 2015    (MY) .......................... PI2015000622

(51) Int. Cl.
| | |
|---|---|
| B63B 1/20 | (2006.01) |
| B63B 1/04 | (2006.01) |
| B63B 39/06 | (2006.01) |
| B63B 1/22 | (2006.01) |
| B63B 1/32 | (2006.01) |
| B63B 1/06 | (2006.01) |
| B63B 1/08 | (2006.01) |

(52) U.S. Cl.
CPC ................ *B63B 1/042* (2013.01); *B63B 1/06* (2013.01); *B63B 1/08* (2013.01); *B63B 1/22* (2013.01); *B63B 1/322* (2013.01); *B63B 39/06* (2013.01); *B63B 2001/201* (2013.01); *Y02T 70/12* (2013.01)

(58) Field of Classification Search
CPC ....... B63B 1/18; B63B 1/20; B63B 2001/201; B63B 2001/202; B63B 39/061
See application file for complete search history.

(56) References Cited

U.S. PATENT DOCUMENTS

| | | | |
|---|---|---|---|
| 2,039,585 | A | 5/1936 | Eddy |
| 4,004,534 | A | 1/1977 | Allison |
| 4,393,802 | A | 7/1983 | Rizzo |

(Continued)

FOREIGN PATENT DOCUMENTS

| | | |
|---|---|---|
| CN | 103328316 A | 9/2013 |
| EP | 1685020 B1 | 8/2006 |

(Continued)

OTHER PUBLICATIONS

Authorized Officer: Nakamura, Taijiro, "International Search Report and Written Opinion" issued in counterpart PCT application No. PCT/MY2016/050013, dated Sep. 15, 2016.

(Continued)

*Primary Examiner* — Andrew Polay
(74) *Attorney, Agent, or Firm* — Mark M. Friedman

(57) ABSTRACT

The invention is a watercraft with at least one hull which creates hydrodynamic lift by using narrowing concave channels (1) on the underside of the said at least one hull where propulsion (3) is placed such that the said propulsion draws water through the said narrowing concave channels (1).

20 Claims, 1 Drawing Sheet

(56) References Cited

U.S. PATENT DOCUMENTS

| | | | |
|---|---|---|---|
| 5,265,554 A | 11/1993 | Meredith | |
| 5,448,963 A | 9/1995 | Gallington | |
| 5,718,184 A * | 2/1998 | Holland | B63B 1/042 |
| | | | 114/271 |
| 5,934,218 A | 8/1999 | Chen | |
| 6,318,286 B1 | 11/2001 | Nakashima et al. | |
| 6,631,690 B2 | 10/2003 | Mambretti | |
| 6,834,605 B1 * | 12/2004 | Franke | B63B 1/042 |
| | | | 114/61.3 |
| 6,895,883 B2 * | 5/2005 | Coles | B63B 1/20 |
| | | | 114/274 |
| 6,912,967 B1 | 7/2005 | Oats et al. | |
| 7,201,111 B1 | 4/2007 | Burkett | |
| 7,428,877 B2 | 9/2008 | Tsumiyama | |
| 2001/0001940 A1 | 5/2001 | Robinson et al. | |
| 2004/0206290 A1 | 10/2004 | Morris | |
| 2005/0016435 A1 * | 1/2005 | Robinson | B63B 1/38 |
| | | | 114/291 |
| 2010/0313808 A1 | 12/2010 | Hansen | |
| 2011/0030607 A1 | 2/2011 | Mannerfelt et al. | |
| 2011/0146555 A1 | 6/2011 | von Lignau | |
| 2011/0265705 A1 | 11/2011 | Spade et al. | |
| 2012/0192781 A1 | 8/2012 | Brizzolara | |

FOREIGN PATENT DOCUMENTS

| | | |
|---|---|---|
| JP | H0210193 U | 1/1990 |
| JP | 3170255 B2 | 8/2000 |
| JP | 2009262588 A | 11/2009 |

OTHER PUBLICATIONS

Kalkomey Enterprises, LLC., "Hull Types and How They Operate", Boat Pennsylvania Course, Apr. 2, 2012, 3 pp., https://www.boat-ed.com/pennsylvania/studyGuide/Hull-Types-and-Flow-They-Operate/101039_101039011/.

"Boat Hull Types & Designs", BOATERexam.com, Apr. 26, 2018, 2 pp., https://www.boaterexam.com/boating-resources/boat-hull-types-designs.aspx.

Dean Travis Clarke, "Six Amazing Boat Hull Designs", Boating Magazine, Oct. 25, 2016, 3 pp., https://www.boatingmag.com/six-amazing-hull-designs/#page-3.

* cited by examiner

WATERCRAFT USING NARROWING CONCAVE CHANNELS

TECHNICAL FIELD

The invention relates to a watercraft with at least one hull using narrowing concave channels with water propulsion.

BACKGROUND OF THE INVENTION

A goal of naval engineering is to achieve higher speeds and achieve greater fuel efficiency. Usually this is achieved by reducing hydrodynamic drag in the water and one of the best known ways to do this is to decrease wetted surface of the hull which implies hydrodynamic lift is required.

Prior art on planing hulls achieve hydrodynamic lift by presenting a surface angled slightly upward to horizontal which forces water downward thereby creating hydrodynamic lift as the said hull moves forward through the water. This concept of hydrodynamic lift is proven only to work efficiently for relatively small watercraft with low displacement hulls. Presenting an inclined surface as the hull moves forward through the water has two components of force: the first component pushes water downward and results in a reactionary upward force on the said hull; the second component pushes water forward which creates a 'bow wave' which larger planing vessels are unable to climb over without massive amounts of propulsive power. In fact, propulsive power required to plane increases exponentially as hull displacement increases.

Large planing watercraft able to carry large payloads and capable of much higher speeds than any displacement craft would be of great economic benefit. However, large planing watercraft designs of prior art need to achieve high speeds in order to overcome the bow wave their hulls generate to be able to plane. These watercraft designs of prior art unfortunately cannot achieve the required speed unless they are already planing. The initial answer to this dilemma was the hydrofoil.

Although hydrofoils were once favoured to produce hydrodynamic lift for larger watercraft, the disadvantages associated with their use led to their decline in use over the years.

SUMMARY OF THE INVENTION

The invention is a watercraft which uses a novel method of achieving hydrodynamic lift using concave channels to bring a large watercraft to plane safely, efficiently and at a relatively lower speed and requiring much less power than planing watercraft of prior art.

Watercraft of prior art using a hull with concave channels do offer certain advantages over traditional 'V' shaped planing hulls in terms of planing efficiency in that the concave channels direct water under the hull as opposed to allowing the water to displace to the sides of the hull. However, prior art on concave channel hulls still present an inclined surface as the said hull moves through the water to create hydrodynamic lift and hence still create a bow wave as in prior art on 'V' shaped hulls.

The invention achieves hydrodynamic lift in a totally different manner in that no inclined surface is required to produce hydrodynamic lift. The invention uses a similar principle of providing hydrodynamic lift as hydrofoils but without the associated disadvantages commonly found in systems using hydrofoils.

A key advantage of the invention compared to watercraft of prior art is that prior art requires the planing hull to achieve a relatively high speed to plane which is impeded by the bow wave which it creates whilst the invention only requires water flow within the said channels to create the required hydrodynamic lift to plane.

The invention is a hull with channels at the underside of the said hull where dynamic pressure is created to lift the watercraft to a planing state quickly and efficiently using strategically placed water based propulsion. Besides propelling the watercraft of the present invention, the propulsion also draws water through the channels which gradually narrow towards the stern of the said watercraft of the present invention thereby creating hydrodynamic pressure within the channels instead of pushing an inclined surface towards a body of water as in prior art.

The invention is envisioned to be the only commercial viable means to bring a large marine watercraft to a planing state efficiently and continue to safely operate on plane; a feat that is currently not possible with prior art.

BRIEF DESCRIPTION OF THE DRAWINGS

In order that the invention may be more readily understood and put into practical effect, a preferred example of the invention will now be described with reference to the accompanying drawings which are as follows.

DETAILED DESCRIPTION OF PREFERRED EMBODIMENTS

Figure 1:
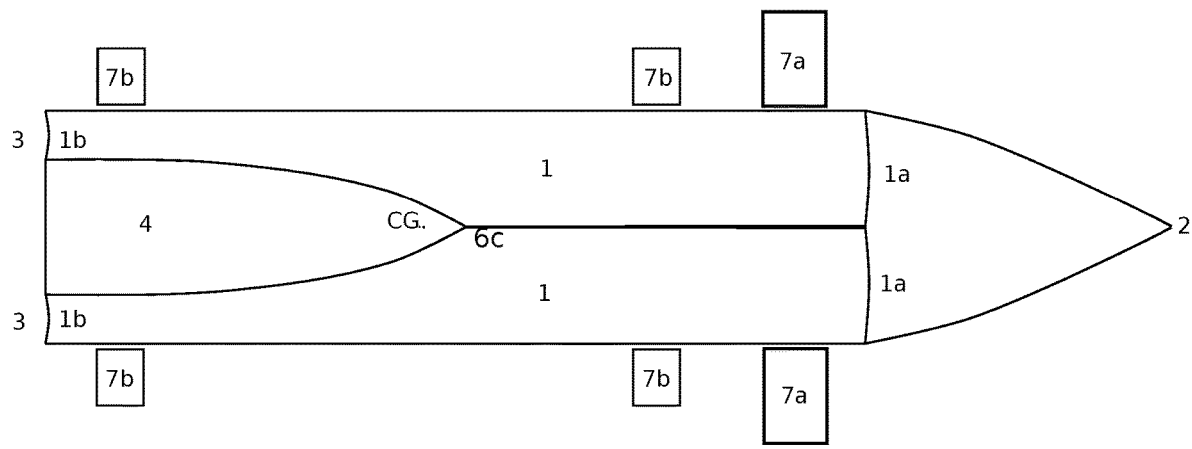
FIG. 1. Underside view of the invention illustrating the narrowing channels, planing pad and its position with respect to the centre of gravity (CG)

The channels 1 narrows as they pass the design longitudinal centre of gravity CG as illustrated in FIG. 1. This narrowing of the channel creates hydrodynamic lift by virtue of increasing dynamic pressure in the said channels on the underside of the hull. In the preferred embodiment the concave channels narrow towards the stern gradually so that hydrodynamic resistance is kept to a minimum whilst providing the necessary hydrodynamic lift.

The gradual narrowing of a water channel on the underside of the hull 1 to create dynamic pressure under the hull may seem so simple that it is should be common knowledge to those skilled in the craft, but, most prior art on traditional 'V' shaped planing hulls do not use any such water channels under the hull. Furthermore, most prior art on water channels on the underside of a hull specifically keep the channel width constant but decrease the channel's depth from bow to stern to provide a traditional inclined surface which is known to result in a bow wave. Furthermore, prior art on hulls with concave water channels do not claim or disclose propulsion effects on dynamic pressure within the said narrowing concave channels. Thus, the invention is indeed unique as it uses principles and methods which are uncommon to those skilled in the craft.

How the narrowing channels work may be explained by the Bernoulli principle. Assuming the flow rate is uniform across the said channel, the velocity of a fluid such as water is highest in the narrowest part of the said channel and lowest at the widest part. Following the Bernoulli principle, the pressure exerted by the fluid is thus highest at the widest part of the channel and lowest in the narrowest part. With the widest part of the channel positioned at or forward of the longitudinal centre of gravity of the watercraft (CG) and the said channel narrowing from this point towards the stern of the hull, a positive pressure to efficiently lift the hull to a planing state without having to overcome a bow wave as required by a traditional planing hull is created. It is possible to have a wide channel over the entire length of the underside of the hull where this said channel only narrows near to the stern such that dynamic pressure applies to almost the entire length of the hull. This is not practical in the preferred embodiment because longitudinal instability will result the moment there is insufficient water flow through the channel. For practical purposes, the longitudinal centre of gravity is best located between the narrowest point and the widest point of the channels.

The preferred embodiment of the invention uses dual narrowing concave channels 1 on the underside of the hull both having an entrance 1a, an exit 1b and propulsion 3 in the water flow of each channel. These channels 1 are placed longitudinally side by side such that hydrodynamic lift for both port and starboard sides of the hull can be individually controlled. This particular variant of the invention is thus also expected to turn well even without the use of rudders since a difference in flow rates between the port and starboard channels 1 will result in the invention turning but also rolling into the turn i.e roll and yaw. Control of water flow in each channel can also be further enhanced through the use of the hinged flaps 6a,6b,6c. Hinged flap 6c works in the same plane as a rudder but instead controls the difference in flow rates in the two channels 1. When hinged flap 6c is in the closed position it does not impart any change to the flow rates of the two channels.

Figure 2:
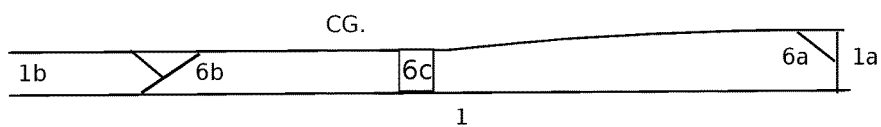
FIG. 2. Side cross-sectional view of the lateral centre of a channel 1 illustrates the slight inclined surface with respect to the centre of gravity (CG) and also thus illustrates the slightly varying depth of the front longitudinal section of a channel 1

The height of the channels 1 reduce slightly from the said entrance 1a to a point slightly forward of the longitudinal centre of gravity (CG) as illustrated in FIG. 2. Although this does provide a traditional planing surface it is not the primary motivation. This is done to reduce the wetted surface when the hull is already planing. Thus the angle presented is much less inclined than that which is required for traditional planing.

Once the invention is on plane, slamming then becomes an issue as in all planing hulls in rough seas. The invention inherently solves this problem. Hinged flaps 6a,6b are usually open and allow water to flow unimpeded through the channels 1, however when the hull has separated from the surface of the water, hinged flaps 6a,6b close and the concave channels 1 become channels of trapped air. The concave channels of trapped air provide an air cushion effect to reduce the effects of slamming. The concave shape within the channels allows progressive compression of the trapped air further improving the cushioning effect. FIG. 2 illustrates hinged flaps 6a and 6b in their closed state. Hinged flap 6b is at an angle such that debris is deflected downward and outward in its closed state and thus prevents debris from entering the propulsion 3.

In FIG. 1, the planing pad 4 formed between the channels supports the said watercraft of the present invention while it is in a planing state. The narrowing channels 1 on both sides of this planing pad 4 quickly bring the invention to a planing state. However, once the invention is planing, the concave channels 1 no longer provide the same hydrodynamic lift as most of the channels 1 are already out of the water. It is the planing pad 4 which dynamically supports the invention while it is on plane at high speed. For the sake of longitudinal stability the design centre of gravity (CG) lies above the planing pad 4 and to the rear of the widest point of the channels 1. The side of the planing pad 4 forms part of the concave walls of the channels 1.

The wave piercing stem of the bow 2 acts to pierce through an incoming wave thus the stem comes to a point at the front. The stem of the bow does not need to generate any upward component of force because the concave channels 1 provide all the hydrodynamic lift that is required and thus the stem of the bow can be vertical or inclined. In the preferred embodiment the bow stem directs water into the channels.

The function of control surfaces 7a and 7b is to control the invention especially in pitch and roll and may be deployed under or above the design waterline. Control surfaces 7a are air based control surfaces and are larger than the water based control surfaces 7b.

Concave channels give the hull of the invention the unique ability to plane more efficiently than prior art whilst the control surfaces and the wave piercing bow enable safe and comfortable operation in high sea states at speeds not possible for craft of prior art with hulls of the same displacement.

Figure 3:
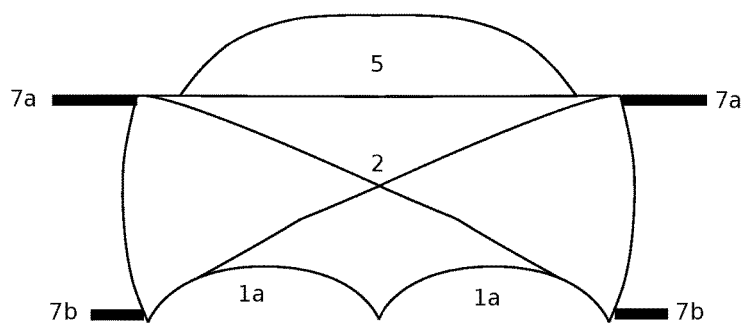
FIG. 3. Frontal view of the invention illustrating the concave shape of the channels

FIG. 3 illustrates the frontal view of the preferred embodiment where the superstructure 5 is preferably aerodynamic. The channel entrances 1a illustrate the concave cross-sectional shape of the channels 1 on the underside of the hull of the watercraft in the preferred embodiment of the invention. Also illustrated are the positions of air based control surfaces 7a and water based control surfaces 7b.

Propulsion 3 may be in the form of waterjets, surface drive propellers, podded propulsion or any other type of water based propulsion. Propulsion 3 has a means to direct their thrust where rudders, hinged flaps and any other means to direct propulsion may be used.

The invention also works well to provide hydrodynamic lift to non planing watercraft such as submarines.

While the invention has been shown and described with reference to the preferred embodiment thereof, it will be understood by those skilled in the art that various change in form and detail may be made therein without departing from the spirit and scope of the invention.

The embodiments of the invention in which an exclusive property or privilege is claimed are defined as follows:

What is claimed is:
1. A watercraft comprising:
at least one hull; and
at least one depression on the underside of the at least one hull, the at least one depression forming two channels having a planing pad between the two channels; wherein: the at least one depression is located completely below the static waterline;
the centre of gravity (CG) of the watercraft is located longitudinally at the widest lateral point of the depression or between the widest lateral point of the depression and the narrowest lateral point of the same depression; and
the lateral width at any point of the depression at a stern longitudinal section of the watercraft is narrower than the widest lateral point of the depression such that a most forward portion of the at least one depression spans a majority of a width of the at least one hull and such that a most rearward portion of the at least one depression spans less than the majority of the width of the at least one hull.

2. A watercraft as in claim 1 where for each of the at least one hull, a longitudinal side of the depression closest to the port side of each hull and a longitudinal side of the depression closest to the starboard side of the same hull are symmetrical in depth.

3. A watercraft as in claim 1 where the at least one depression has at least one entrance at a bow side of the depression such that water can flow horizontally into the depression.

4. A watercraft as in claim 3 where the at least one depression has at least one exit at a stern side of the depression such that water can flow horizontally out of the depression thereby forming at least one channel on the underside of the watercraft hull for water to flow through freely.

5. A watercraft as in claim 4 where the combined widths of lateral cross sections of the at least one entrance is greater than the combined widths of the lateral cross sections of the at least one exit.

6. A watercraft as in claim 4 further comprising at least one water propulsor that forces water through the at least one channel.

7. A watercraft as in claim 5 where the lateral cross section in at least one longitudinal portion of the at least one channel is concave in shape.

8. A watercraft as in claim 4 where at least a longitudinal section along a channel of the at least one channel varies in depth.

9. A watercraft as in claim 1 further comprising at least one movable control surface attached to the at least one hull.

10. A watercraft as in claim 1 where the at least one depression has at least one exit at a stern side of the depression such that water can flow horizontally out of the depression thereby forming at least one channel on the underside of the watercraft hull for water to flow through freely.

11. A watercraft as in claim 10 further comprising at least one water propulsor that forces water through the at least one channel.

12. A watercraft as in claim 10 where the lateral cross section in at least one longitudinal portion of the at least one channel is concave in shape.

13. A watercraft as in claim 10 where at least a longitudinal section along a channel varies in depth.

14. A watercraft comprising:
at least one hull; and
at least one depression on the underside of the at least one hull, the at least one depression forming at least one channel, at least one hinged flap disposed in the at least one channel; wherein: the at least one depression is located completely below the static waterline;
the centre of gravity (CG) of the watercraft is located longitudinally at the widest lateral point of the depression or between the widest lateral point of the depression and the narrowest lateral point of the same depression; and
the lateral width at any point of the depression at a stern longitudinal section of the watercraft is narrower than the widest lateral point of the depression such that a most forward portion of the at least one depression spans a majority of a width of the at least one hull and such that a most rearward portion of the at least one depression spans less than the majority of the width of the at least one hull.

15. The watercraft of claim 14, wherein the at least one depression has at least one entrance at a bow side of the at least one depression such that water can flow horizontally into the at least one depression.

16. The watercraft of claim 15, wherein the at least one depression has at least one exit at a stern side of the depression such that water can flow horizontally out of the depression thereby forming the at least one channel on the underside of the watercraft hull for water to flow through freely.

17. The watercraft of claim 16, wherein the combined widths of lateral cross sections of the at least one entrance is greater than the combined widths of the lateral cross sections of the at least one exit.

18. The watercraft of claim 16 further comprising at least one water propulsor that forces water through the at least one channel.

19. The watercraft of claim 17, wherein the lateral cross section in at least one longitudinal portion of the at least one channel is concave in shape.

20. The watercraft of claim 16, wherein at least a longitudinal section along a channel of the at least one channel varies in depth.

* * * * *